United States Patent Office 2,934,947
Patented May 3, 1960

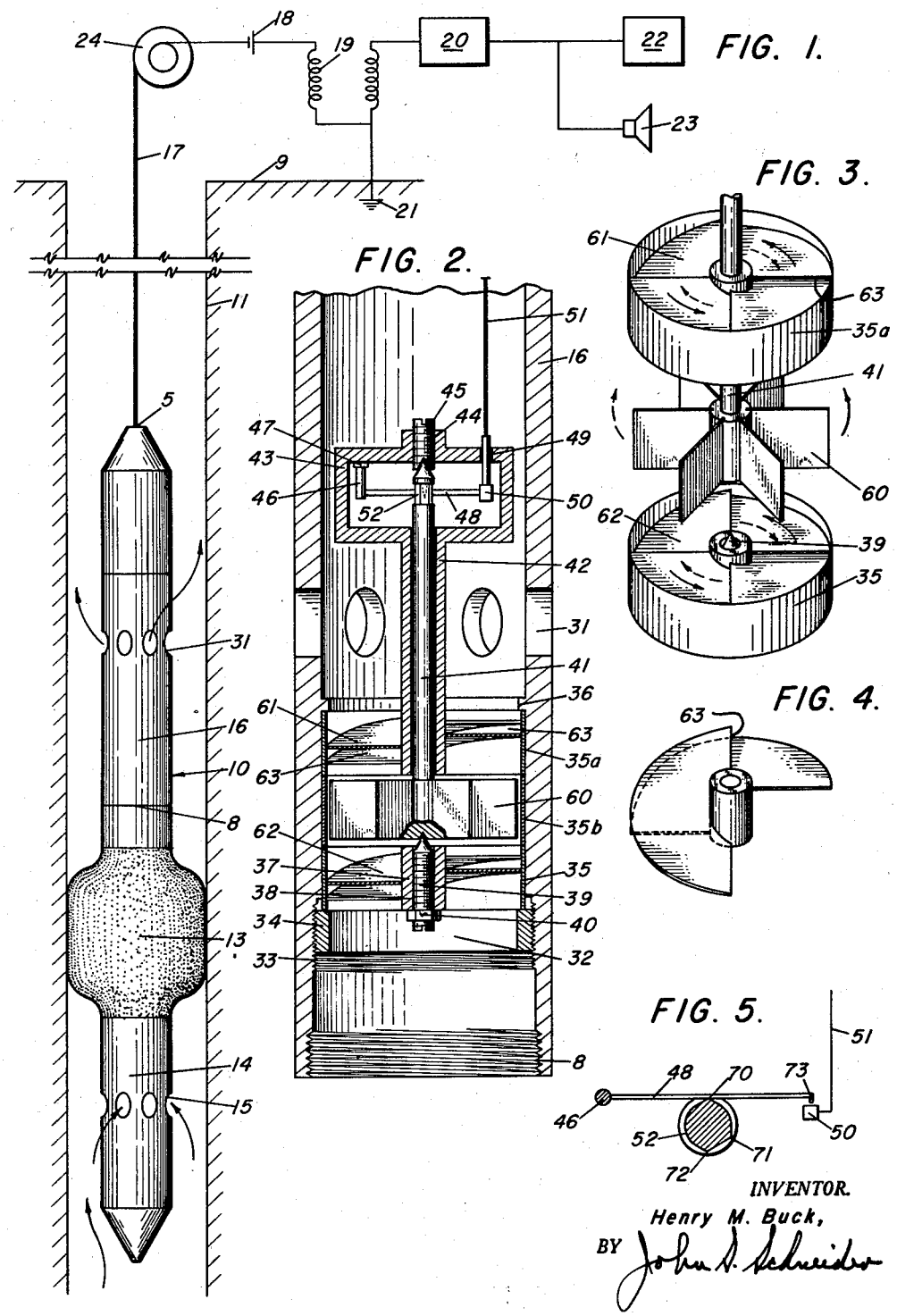

2,934,947

FLOWMETER

Henry M. Buck, Houston, Tex., assignor, by mesne assignments, to Jersey Production Research Company, Tulsa, Okla., a corporation of Delaware Application August 8, 1955, Serial No. 526,916

7 Claims. (Cl. 73—155)

This invention relates to a flowmeter for determining the rate and direction of fluid flow in a well bore.

An object of this invention is determination of the direction and rate of fluid flow by providing deflector means for directing the fluid flow to impinge upon rotatable blades, the fluid flowing in one direction rotating the blades clockwise, the fluid flowing in an opposite direction rotating the blades counterclockwise.

A further object of this invention is to provide registering means operatively connected to the rotatable blades whereby the rate of fluid flow in either direction may be determined.

Referring to the drawings wherein identical numerals designate identical parts:

Fig. 1 is an elevational view of the device inserted in a borehole and the connecting electrical circuit preferably employed;

Fig. 2 is an enlarged vertical sectional view of the device;

Fig. 3 is a perspective view of the upper and lower fluid flow deflectors and the rotatable blades spaced apart for details in showing;

Fig. 4 is a cutaway section of the deflector blades of Fig. 3; and

Fig. 5 is a top view, partly diagrammatic of the rate and direction of flow determining means.

Referring more particularly to Fig. 1, the flowmeter device generally designated 10 is shown inserted in a borehole 11. A packer member 13 may be employed to seal off the flow in the borehole to insure that all or substantially all of the fluid flowing in the borehole will pass through the meter. The device, as shown in Fig. 1, comprises an upper section 16 and a lower housing section 14 screw threadedly connected at 8. The lower section 14 carries packer 13. Flow entry and exit passages 15 and 31 are provided by the lower and upper housing sections, respectively. An electrical conducting cable 17, attached to upper housing section 16 in any manner as at 5, may be used for lowering and raising the device in the borehole. Also, the cable 17 will conduct the electrical impulses registered in the device to the surface electrical circuit.

This circuit on the earth's surface 9 may have an electrical energy source 18, a transformer 19, an amplifier 20, and a ground 21. The electrical impulses generated may be registered on a pulse rate indicator 22 or an aural monitor 23. Sheave 24 is employed to raise and lower cable 17.

The meter itself, as shown in Fig. 2, comprises cylindrical housing 16 provided with fluid flow inlet and outlet ports 31 and 32; if the fluid is flowing downwardly, ports 31 are the inlets and port 32 is the outlet whereas if the fluid is flowing upwardly, port 32 is the inlet and ports 31 are the outlets. The lower portion of housing section 16 is provided with screw threads 33 for screw threadedly engaging a cylindrical collar 34. The upper shoulder of collar 34 supports the lower end of a cylindrical sleeve 35 which in turn supports sleeve 35b. Sleeve 35b supports sleeve 35a and the latter is prevented from moving upwardly by annular shoulder 36 formed integrally with housing section 16.

An axial sleeve 37 extends vertically in the housing and is provided with screw threads 38 for engagement with a screw threaded, vertical pivot bearing 39. A retaining nut 40 secures bearing 39 to the sleeve 37 and permits adjustment of the bearing in a vertical direction. An axial rotatable shaft 41 is positioned on pivot bearing 39 and extends upwardly through a second cylindrical sleeve 42. Sleeve 42 forms a cylindrical container or housing 43 in its upper portion. Axial shaft 41 extends into this housing. The top of housing 43 is provided with a threaded opening 44 into which a second pivot bearing 45 is screwed. The upper end of shaft 41 pivots on the bearing 45. A combined cam rider arm and switch contact is located in housing 43. This arm has a vertically extending section 46 affixed to the housing in any desired manner, as at 47, and a horizontally extending leaf spring section 48 having a switch contact end 73 (Fig. 5) attached thereto. A switch contact member 50 is located in housing 43 and to this switch contact member 50 is connected an electrical conductor 51 extending through housing opening 49 and connecting with cable 17. The upper portion of shaft 41 contains a coded cam 52 which will be described in detail later. Leaf spring 48 normally biases against cam 52 and switch contact member 50, as shown more clearly in Fig. 5.

Vertical, radially extending rotor blades 60 are fixed in any desired manner to axial shaft 41 for rotation therewith. Deflector 61 is attached to inner and outer sleeves 42 and 35a, respectively. Deflector 62 is attached to inner and outer sleeves 37 and 35, respectively. The outer sleeves provide support for the inner sleeves through the connecting deflector blades.

Figs. 3 and 4 show the deflectors in greater detail. The deflectors comprise four semicircular members each overlapping in a 90 degree segment, as shown more clearly in Fig. 4. The arrows in Fig. 3 indicate the direction of flow through the deflectors. The solid line arrows indicate a counterclockwise downward flow direction, and the dotted line arrows indicate a clockwise upward flow direction. The opening 63 is adjustable to any desired width, that is, the smaller the opening 63 the greater the sensitivity to fluid flow and the larger the opening, the greater the volume of flow therethrough. The deflectors are identical as shown, however, as noted supra, the deflection of the fluid flow will be opposite for upward and downward flow.

As shown more clearly in Fig. 5, the cam 52 has three point duration irregularly spaced cam rider raised surfaces 70, 71, and 72 and any desired number of elevated surfaces greater than the three shown may be used. However, at least three raised cam rider surfaces are necessary when the surfaces are of point duration as specifically shown in Fig. 5 in order to obtain differentiation between the directions of revolution of the cam. The term "coded cam" means the raised surfaces are so spaced that a distinct "code" or signal is transmissible on each revolution of the cam. The code may be transmitted by any desired means.

Operation

In operation the device is inserted in the borehole 11 and the packer 13 utilized to seal off the annulus between the casing 14 and the wall of the borehole. Fluid flowing upwardly will enter the flowmeter through inlet ports 15 and opening 32 and be deflected in one circumferential direction by deflectors 62 against rotor blades 60. This will cause rotatable blades 60 to rotate shaft 41 which in turn causes rotation of coded cam 52. The fluid passes through the upper deflectors 61 and passes out of the device through ports 31. Cam rider and switch contact leaf spring 48 biased against cam 52 will move laterally as the cam rotates. This will cause the contact end 73 of arm 48 to make and break contact with switch contact member 50. The irregularly spaced impulses will be transmitted to the surface through cable 17 and be indicated on the pulse rate indicator or the aural monitor. The irregular spacing of the rider surfaces of the cam permit an easy determination of the direction of flow. The rate of transmission of the impulses will determine the rate of flow.

Fluid flowing downwardly through ports 31, deflectors 61 and out through spider ports 32 will operate in generally the same manner as fluid flowing upwardly. However, because the deflectors 61 deflect the fluid flowing downwardly therethrough in an opposite direction to that flowing upwardly through deflectors 62, the shaft 41 will rotate in an opposite direction to that when the fluid is flowing upwardly which in turn will rotate the coded cam in an opposite direction. The three irregularly spaced cam surfaces will then transmit a different coded signal to the surface and consequently the direction of flow, whether upwardly or downwardly, can be readily determined. Again, the rate of transmission of the signals will determine the rate of flow in the borehole.

The electrical coded cam-type registering means is shown as my preferred embodiment. However, any type of fluid flow indicating means may be employed. For example, a mechanical counter-type mechanism may be used.

I claim:

1. A flowmeter for detecting rate and direction of fluid flow in a well bore comprising a housing provided with upper and lower ports, a rotatable shaft arranged in said housing, rotor means connected to said shaft between said upper and lower ports adapted to rotate said shaft, fluid flowing in one direction rotating said rotor means in one circumferential direction and fluid flowing in an opposite direction rotating said rotor means in an opposite circumferential direction, first and second stationary deflector means positioned in said housing directly adjacent to and above and below, respectively, said rotor means adapted to direct fluid flowing downwardly through said deflector means in said one direction and to direct fluid flowing upwardly through said deflector means in said opposite direction, said deflector means being provided with a plurality of openings, the size of said openings determining the sensitivity of the rotor means to fluid flow and flow indicating means operably connected to said shaft adapted to indicate rate and direction of fluid flow.

2. Apparatus as recited in claim 1 wherein said deflector means openings are made sufficiently small so as to provide a jetting action for the fluid passing therethrough.

3. A device as recited in claim 2 wherein said rotor means comprises radially extending blades.

4. A device as recited in claim 3 wherein said deflector means comprises a plurality of overlapping, laterally extending deflectors.

5. A device as recited in claim 4 wherein said deflectors overlap 90°.

6. A device as recited in claim 5 wherein said indicating means comprises an electrical circuit including a source of electrical energy, an electric switch, and an electric impulse registering means, a cam mounted on said shaft for rotation therewith and having at least 3 point duration irregularly spaced cam rider surfaces, and a cam follower arm spring biased against said cam and said switch for opening and closing said switch on rotation of said cam.

7. A device as recited in claim 6 including a packer member arranged on said housing between said upper and lower ports adapted to seal off the space between said housing and the well bore wall to force well fluid through said housing.

References Cited in the file of this patent

UNITED STATES PATENTS

| | | |
|---|---|---|
| 138,657 | Johnson | May 6, 1873 |
| 299,418 | Parkinson | May 27, 1884 |
| 1,440,778 | Foster | Jan. 2, 1923 |
| 2,146,827 | Kruspi | Feb. 14, 1939 |
| 2,333,164 | Fisher | Nov. 2, 1943 |
| 2,334,920 | Gosline et al. | Nov. 23, 1943 |
| 2,379,138 | Fitting et al. | June 26, 1945 |
| 2,671,174 | Burgholz | Mar. 2, 1954 |
| 2,683,224 | Cole | July 6, 1954 |
| 2,741,917 | Piety et al. | Apr. 17, 1956 |
| 2,786,351 | Wiley et al. | Mar. 26, 1957 |